United States Patent [19]
Sims

[11] Patent Number: 5,886,314
[45] Date of Patent: Mar. 23, 1999

[54] PIPE CUTTING APPARATUS

[76] Inventor: Peter James Sims, P.O. Box 222, Waterford Qld 4133, Australia

[21] Appl. No.: 648,021
[22] PCT Filed: Nov. 17, 1994
[86] PCT No.: PCT/AU94/00712
  § 371 Date: May 15, 1996
  § 102(e) Date: May 15, 1996
[87] PCT Pub. No.: WO95/13897
  PCT Pub. Date: May 26, 1995

[30] Foreign Application Priority Data

Nov. 17, 1993 [AU] Australia ................ PM2480

[51] Int. Cl.$^6$ .................................................. B23K 10/00
[52] U.S. Cl. .................... 219/121.44; 219/61.3; 219/61.5; 219/121.59; 266/57
[58] Field of Search ................ 219/121.39, 121.44, 219/121.48, 121.59, 59.1, 61.3, 61.5, 60 A, 121.67; 266/53, 57, 59, 70, 73

[56] References Cited

U.S. PATENT DOCUMENTS

| | | |
|---|---|---|
| 4,052,039 | 10/1977 | Koyano et al. |
| 4,222,795 | 9/1980 | Hoaglin et al. ............ 148/9.6 |
| 4,349,182 | 9/1982 | Blackburn ................ 266/57 |
| 4,480,821 | 11/1984 | Noll et al. ................ 266/54 |
| 4,483,721 | 11/1984 | Hearn ................ 148/9.6 |

FOREIGN PATENT DOCUMENTS

| | | |
|---|---|---|
| 1.531.255 | 6/1968 | France . |
| 2.056.073 | 5/1971 | France . |
| 2 591 516 | 6/1987 | France . |
| 2 676 947 | 12/1992 | France . |
| 2 246 838 | 4/1974 | Germany . |
| 27 13 541 | 10/1978 | Germany . |
| 34 39 431 | 4/1986 | Germany . |
| 38 22 833 | 10/1989 | Germany . |
| 42 23 755 | 2/1993 | Germany . |
| 42 19 431 | 1/1994 | Germany . |
| 828197 | 2/1960 | United Kingdom . |
| 1017254 | 1/1966 | United Kingdom . |
| 1 495 172 | 12/1977 | United Kingdom . |
| 93/20974 | 10/1993 | WIPO . |

Primary Examiner—Mark H. Paschall
Attorney, Agent, or Firm—Larson & Taylor

[57] ABSTRACT

A profiled end cut is applied to a length of stock pipe in an apparatus wherein the pipe is rotated by a drive head with a plasma cutter moved axially on a trolley in synchrony with rotation under control of a guidance system. The guidance system follows a desired pattern to effect two adjoining end cuts in a single continuous operation. Pipe handling is effected by two sets of rollers, a support set permitting rotation and a lifting set to enable axial movement.

20 Claims, 16 Drawing Sheets

PIPE CUTTING APPARATUS

FIELD OF THE INVENTION

This invention relates to pipe cutting and in particular to a means by which a pipe can be cut to produce a pipe end having a desired contour or shape.

BACKGROUND OF THE INVENTION

Stock pipe is cut to set lengths for many uses. Welded or otherwise interconnected pipe lengths are used to produce railing around balconies, railing for stairs, building trusses, space frames, and the like. Applications vary across a range of pipe diameters. Joints between pipe lengths require a variety of geometries at the pipe ends, depending on their manner of interconnection to ensure that pieces mate adequately for welding or other connection processes. Machines have been devised by which to establish these pipe end cuts.

In standard machines, a slightly over length piece of pipe, which is to be shaped at an end, is placed in the profiling machine, or end cutting machine, and a first end is cut to its required shape using whatever guidance system and cutting method the machine operates with. Then the pipe is removed, turned around, replaced, and its other end is cut after locking the pipe in the machine with its first cut properly aligned relative to the cut to be made. This can be a labour intensive task with large diameter pipes. If the second cut is different, the profiling guidance system will need to be reset. This last process involves an additional amount of labour, particularly in setting up each second cut.

OBJECT OF THE INVENTION

It is an object of the present invention to generally simplify the cutting of the ends of pipe which is to be given a particular shaped end cut.

Advantageously, the present invention effects pipe cutting apparatus wherein the profile cutting of the respective ends of a desired length of pipe is effected off a length of stock without the need for the usual intermediate handling, aligning and resetting of the profile guidance system as described above.

It is possible to repetitively effect a sequence of cuts along a length of stock pipe to produce a number of segments without much of the usual intermediate handling. This can be done either by moving the cutter along the stock length to cut at points therealong, or alternately, by advancing the stock pipe past the cutting device.

Other objects and various other advantages will hereinafter become apparent.

SUMMARY OF THE INVENTION

The invention achieves its object in the provision of a pipe cutting apparatus for providing profiled end cuts to pipe segments which segments are cut off a length of stock pipe which is fed thereto, said pipe cutting apparatus comprising:
 pipe support means for axially aligning a length of stock pipe in the pipe cutting apparatus mounting it for rotation about its axis;
 pipe locating means for rotationally or angularly locating the stock pipe in the pipe cutting apparatus;
 a pipe cutting means for effecting end cuts of a desired shape in the stock pipe; and
 an end cut guidance means;
 the end cut guidance means operatively controlling the pipe locating means and the pipe cutting means in tandem so as to effect a sequence of cuts in the length of stock pipe which is fed into the pipe cutting apparatus, to generate the pipe segments with end cuts having desired shapes.

A pipe handling mechanism is provided in a preferred form to enable both axial adjustment and rotation of the stock pipe.

The end cut guidance means can, in one implementation, use an optical tracker following a computer generated plot on paper. Alternately the computer software which otherwise could be used to drive the plotter can be directly connected to servo motors turning the pipe locating means and moving the pipe cutting means. The first implementation can be used to effect the continuous cutting of adjoining ends with resetting of the stock pipe thereafter for the making of additional cuts to create further segments. This minimizes the degree of pipe handling and resetting needed to be done. The alternate implementation can be used the same way. Additionally it can be used in other sequences to suit different cutting regimes with reduced handling and resetting. When a direct computer driven system is used, if the axial movement mechanism is designed to permit the cutter to move along a substantial length of the pipe, then a multiple of cuts can be performed with the cutter working from a far end of the stock pipe back therealong towards the pipe locating means, cutting segments as it proceeds. This further reduces the amount of pipe handling. With a plasma cutter, for example, the need for cabling and other services to the cutting head may restrict this mode of operation unless the whole cutter mechanism is mounted on a movable trolley or the cable length is increased. The pipe can be clamped once and all the cuts therealong can be created by a software controlled sequence of cuts. Alternately, pairs of cuts can be made and the pipe advanced up to the drive head as each segment is rolled out of the apparatus. Provision can be made to select one or the other of a pair of cuts or both cuts to create more options.

The invention also provides a method of cutting pipe to produce a particular shaped end configuration wherein:
 the pipe is rotated about its axis at a set rate;
 a pipe cutting device is moved axially of the pipe in synchrony with rotation to effect cutting;
 characterised in that
 the pattern of axial movement of the pipe cutting device is governed relative to the rotation to effect the particular end shape which is desired.

It will be appreciated by those skilled in the art that the level of implementation of automation will affect machine value and somewhat lower levels of automation may be desirable to users with reduced expectations.

BRIEF DESCRIPTION OF THE INVENTION

The invention will now be described with reference to a preferred embodiment shown in the accompanying drawings wherein.

DESCRIPTION OF THE PREFERRED EMBODIMENTS

The drawings are schematics. Scale and proportion will vary from machine to machine depending on pipe sizes to be cut, and what cutting apparatus and profile control means are used.

The machine described hereinbelow cuts both of the adjoining ends of adjoining pieces or segments of pipe to be cut from a length of stock pipe, being adapted to cut a pair of end cuts in a single uninterrupted sequence when that is desired. This embodiment utilizes an optical profile tracker operating with a graphic of the desired end profile(s) as a means of providing guidance to the pipe cutter. Other techniques are able to be operated as are described below.

End cutting of a pair of adjoining ends is achieved whether the profile at respective adjoining ends of adjoining segments to be cut off a stock length are the same or different. The rate of production depends on the diameter of the pipe being cut, the profile shape (the greater the length of a particular pattern the more time cutting takes to effect a single end cut), wall thickness of the pipe, material of the pipe (mild steel, stainless steel, aluminium, brass, etc.), and the character of the cutting tool (plasma cutter or other). The machine is designed to readily enable changes such as from one pipe diameter to another, and from one profile to another. This aspect of machine operation is important because the number of identical pipe lengths required per job is rarely very large. Resetting the machine is done frequently over a range of jobs and changeover times are a significant operational factor.

Figure 1:
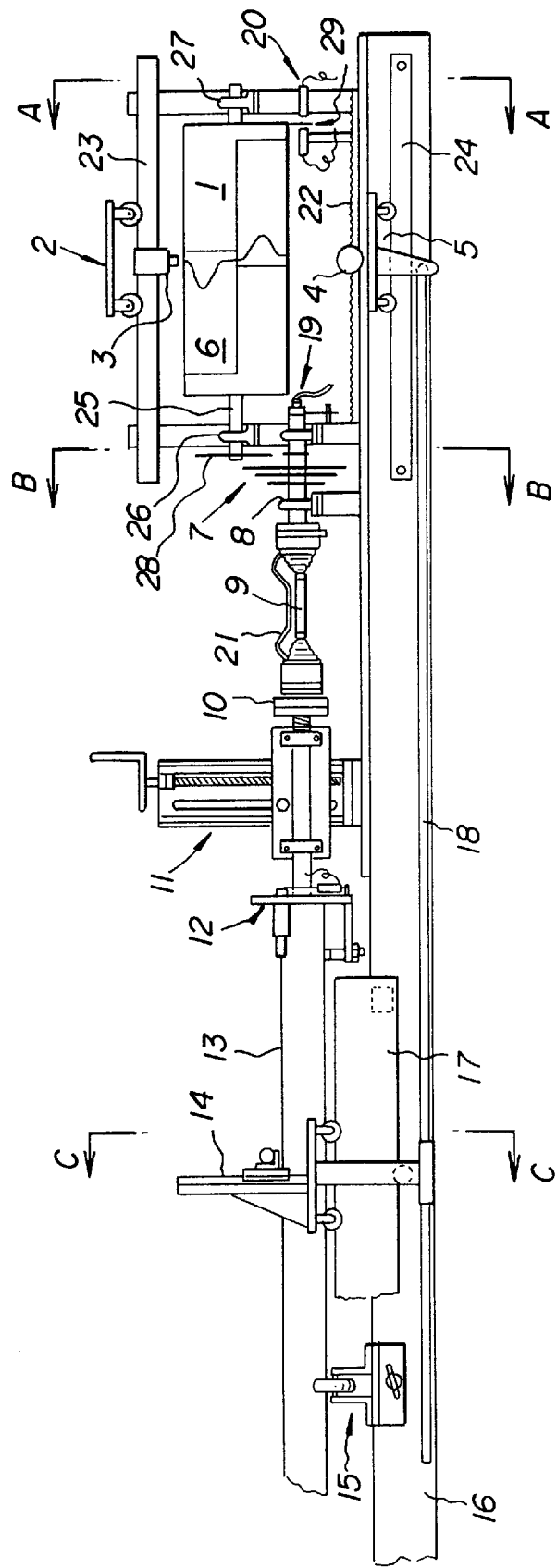
FIG. 1 is an elevation showing the various elements of a pipe cutting apparatus in accordance with the present invention.

In FIG. 1, an apparatus for cutting pipe is shown to have a pipe locating means or drive head with drive plate 12 for holding the end of the pipe which is to be cut. This drive head is driven via shafts 9 and chain and sprockets 7 by an electric motor. Also driven by this motor, via chains on sprockets 7, at exactly half the RPM of the drive head is a cylinder 1 which rotates axially on a shaft fixed through its center. Mounted above and below the cylinder 1 are two steel rails running longitudinally, 23 and 24, and parallel to the cylinder 1, upon which steel wheeled trolleys 2 and 5 can roll. The material and particular details of construction might vary. However, the design is to effect control of a cutter under the influence of an end cut guidance means or profiler and so as to ensure accuracy in the end cut, the stability of the interconnecting parts is an issue. The two trolleys 2 and 5 can be joined by a rod or beam so that they will roll together. Fixed to this beam, directly above top dead centre of the cylinder 1, in this embodiment, is a magic eye or tracer 3, an optical tracking device, and at the lower end of the beam is fixed an electric servo motor 4 which has a toothed gear mounted to its shaft to engage with rack 22. The magic eye or optical tracker might be mounted on the lower trolley and work at the side of the drum or cylinder 1. Other forms of profile tracking might be employed. However, optical trackers are readily available and the software to generate 'paper' patterns for them to operate off is readily generated by a programmer to make this option attractive. It is one which is readily implemented using standard skills applied to basic geometry as will be made more clear herein.

The optical tracker is an optional feature. The patterns which it traces could be produced manually but they are ideally produced by computer software. The output of that software can be made to directly control the drive motor 4 to move the cutting head according to the requisite profile in tandem with rotation of the pipe. The drive motor can then be positioned with the cutting head operating via a gear along a rack extended along the main chassis beam 16. Then, instead of the pipe being advanced up to the locking plate for further end cuts, the cutting head can be moved along the length of stock pipe to the next cutting position. This increases the level of automation but with increased interaction of elements of the machine requiring more equipment to effect control. As the number of pipes which are the same may not be great, moving the stock up to the drive head and resetting is a useful level of development. A movable cutting head is still required to enable production of long segments.

The rack 22 can be mounted to main chassis beam 16 beneath the drum 1 and it is essentially fixed relatively thereto. Operation of the motor 4 causes the two trolleys 2 and 5 to move along their respective tracks 23 and 24. Attached to the lower trolley 5 is a push-pull rod 18 running parallel to the main chassis beam 16. The length of push-pull rod 18 can be supported over idler rollers or wheels (not shown) as will be apparent to those skilled in these arts. This is done to avoid sag and consequent variation in the length of the rod which would introduce a difference between the pattern being traced by the optical profiler and the cut being effected by the pipe end cutter. With greater levels of automation achieved by directly coupling pattern generating software to the motor 4, the rod 18 can be dispensed with, with rack 22 and motor 4 moved along beam 16 to beneath the cutter. Also running parallel, but mounted directly to the main chassis beam 16, is a rail 17 upon which rolls another trolley 14 which has supported thereon the pipe cutting means such as a plasma cutting torch. The cutting means can be mounted so that when it is put into the cutting position it is above top dead centre of the pipe to be cut. The plasma cutting head trolley 14 can be attached to the push-pull rod 18 at any distance therealong from the drive head via a suitable built in clamp by which means the length of pipe portion can be set.

In FIG. 1 a removable pipe support 15 might be provided to support a length of pipe 13 fed into the apparatus up to the drive plate 12. Pipe supports such as 15 are provided to permit rotation of the pipe. So as to effect axial movement of the pipe 13, to move the stock up to the drive plate 12 after a profiled piece is cut and removed, a system of rollers, not shown, could be swung on a pair of support rods, turned by suitable rams to come up beneath pipe 13, lift it slightly off rollers 15 so that it can be rolled along its length up to the drive plate. Then the axial movement rollers can be swung down out of the way to lower the pipe 13 back onto supports 15.

In FIG. 1, patterns 6 are traced on drum 1 by the magic eye 3 as drum 1 and pipe 13 are turned together. The tracking effected by the magic eye 3 moves the pipe cutting means 14 in synchrony therewith.

In FIG. 1, drum 1 may be conveniently fabricated from 247 mm diameter PVC pipe. A sheath of 0.6 mm thick sheet metal might be applied thereto. The PVC pipe might have PVC end caps applied thereto with a round steel shaft passed through their centres. This shaft 25 can have support bearings 26 and 27 at each end. A toothed sprocket 28 can be applied to shaft 25. The sprocket 28 is the means by which the drum 1 is turned. The sprocket ratio is to be set at 2:1 in this embodiment so that drum 1 turns once for two turns of pipe 13 for the reasons set out below. This assembly should be fabricated with attention to accuracy so as to eliminate unevenness in the surface of drum 1 or any irregularity in its rotation. At the end of the drum, opposite sprocket 28 there can be provided a flag 29. This flag 29 may be a piece of PVC sheet or similar projected off the end of drum 1. Its function is to block a light beam of photocell 20 and to brake the rotation of the drum 1. Alternately, micro switches might be activated by an activator on the drum as will be clear to those skilled in the relevant art. A man skilled in the relevant electrical arts will be able to devise many ways in which a sensor which determines the position of the drum can effect, at a set angle of rotation, a braking of the motor driving the system and simultaneously to effect other ancillary actions such as switching off the pipe cutter, be that a plasma torch or other cutter.

Figure 2:
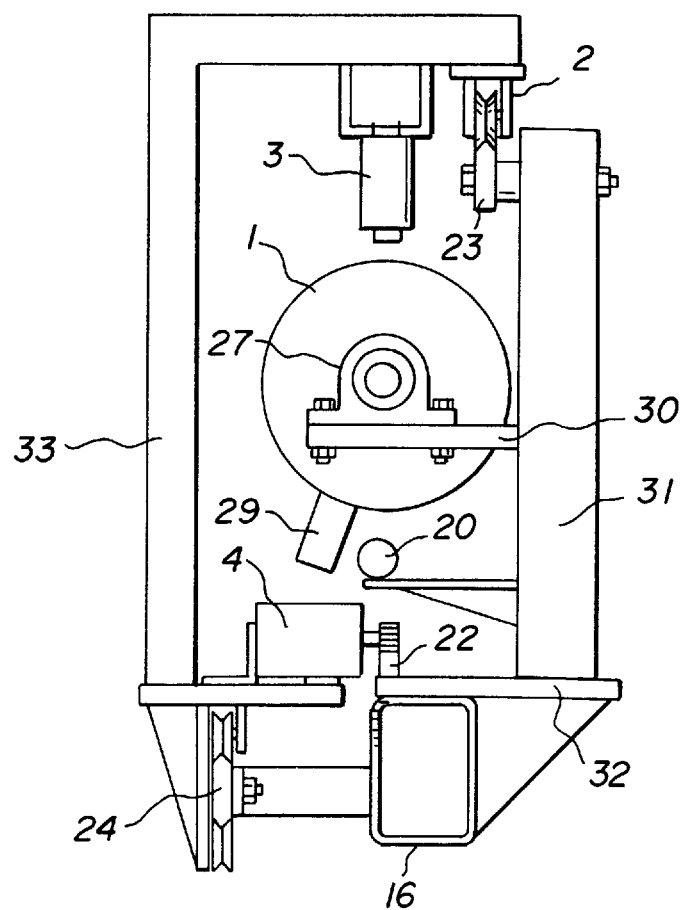
FIG. 2 is a section on 1—1 of FIG. 1.

As seen in end view, FIG. 2 shows drum 1 mounted via bearing 27 on arm 30 off vertical support post 31 which is mounted in turn by bracket 32 to main beam 16. Trolleys 2 and 5 roll on their respective tracks 23 and 24. Trolley 5 may be on a pair of wheels capturing track 24 therebetween by means of their respective complementary profiles. The upper and lower trolleys 2 and 5 are interconnected by frame 33 (not shown in FIG. 1 for clarity). The trolleys are locked to their tracks against sideways movement.

Figure 3:
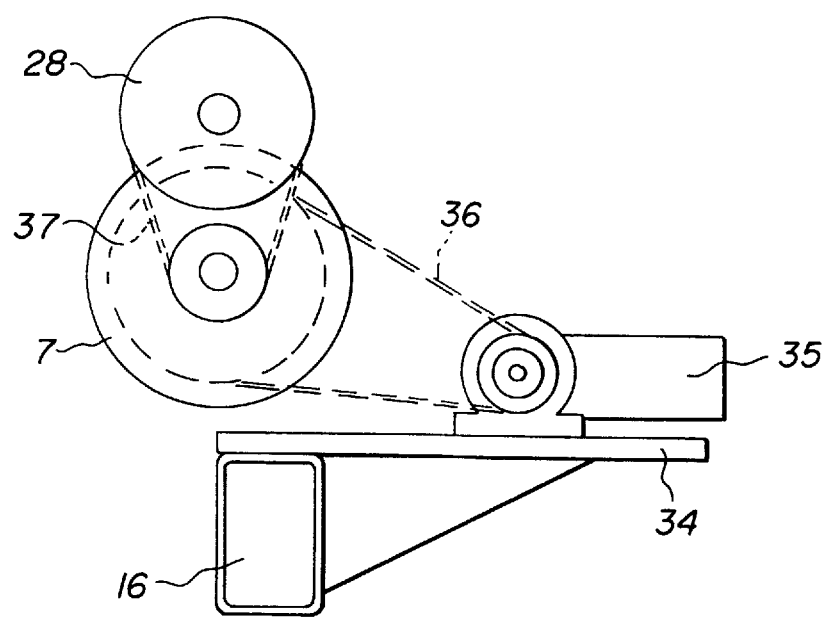
FIG. 3 is a section on 2—2 of FIG. 1.

FIG. 3 shows a motor 35 mounted on bracket 34 off beam 16. Motor 35 is connected by chain 36 to sprockets 7 with chain 37 driving drum sprocket 28. The sprockets 7 may be in a variety of gear ratios, such as, 2:1, 5:1 and 12:1. The gear ratios are only indicative. What gear ratios are required in practice will depend on design parameters such as motor choice, rotational speeds, etc. Gearing between sprockets 7 and 28 is 2:1 as stated above. The motor 35 can be a variable speed permanent magnet type with a built in gear box, typically 75:1. The motor 35 is mounted on slots to enable resetting to take up chain slack and to permit changeovers when other sprocket combinations are used. Other chain tensioning mechanisms might be used.

Figure 4:
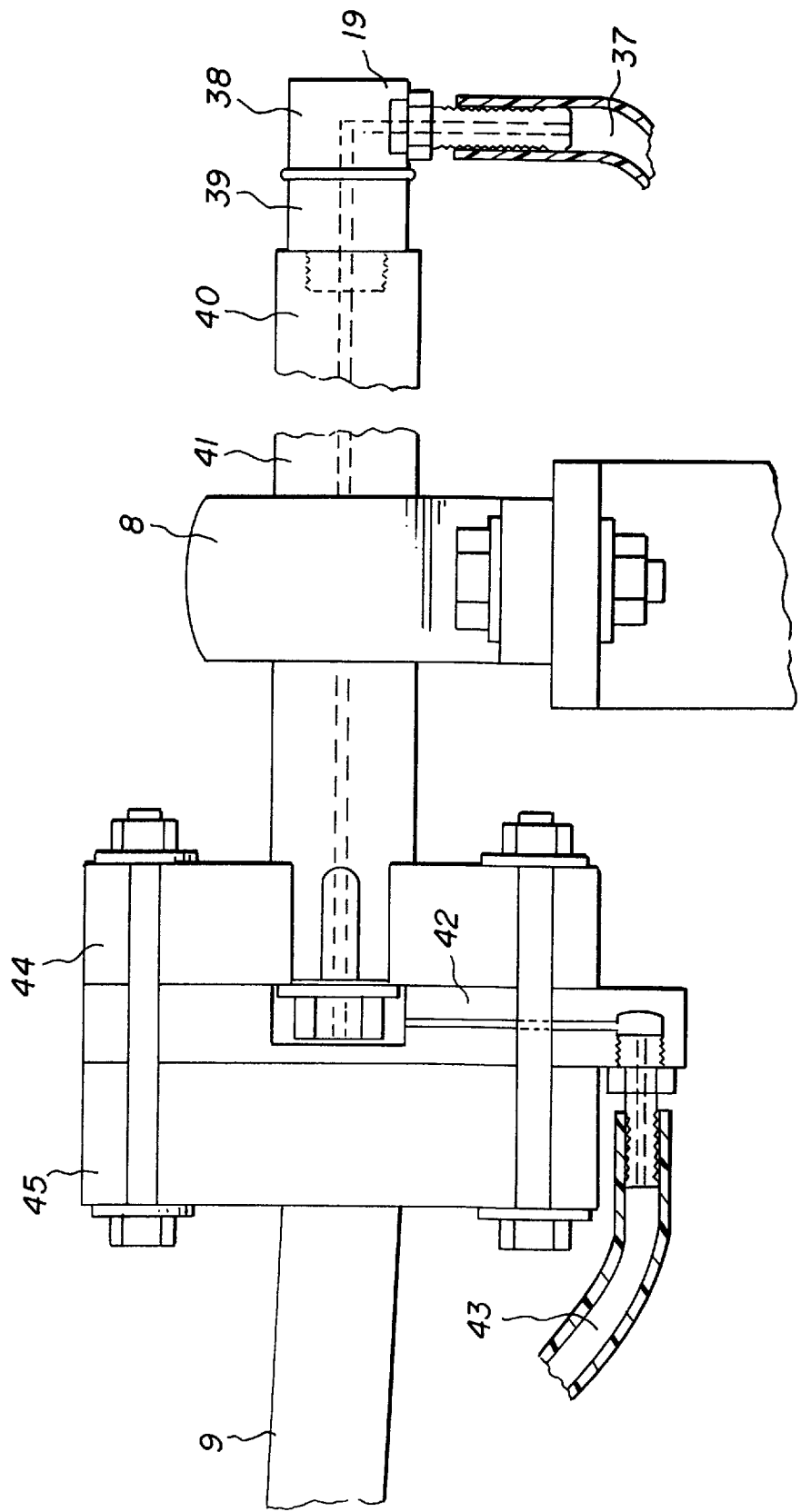
FIG. 4 is a detailed view of a revolving air inlet assembly used in the apparatus of FIG. 1.

FIG. 4 shows a detail at the right hand end of the drive shaft (as seen in FIG. 1). A compressed air inlet at 19 passes compressed air via a revolving joint from airline 37 connected to block 38 to passage 41 in shaft 40. Shaft 40 is supported in bearing 8 and it is bolted via keyed hub 44 to constant velocity joint 45 to drive shaft 9 with an intermediate plate 42 with passage therein to provide an air passage to pipe or airline 43. The compressed air is used (as seen below) to effect clamping of the stock pipe to enable it to be rotated. Other methods of effecting this will become apparent to those skilled in the art.

Figure 5:
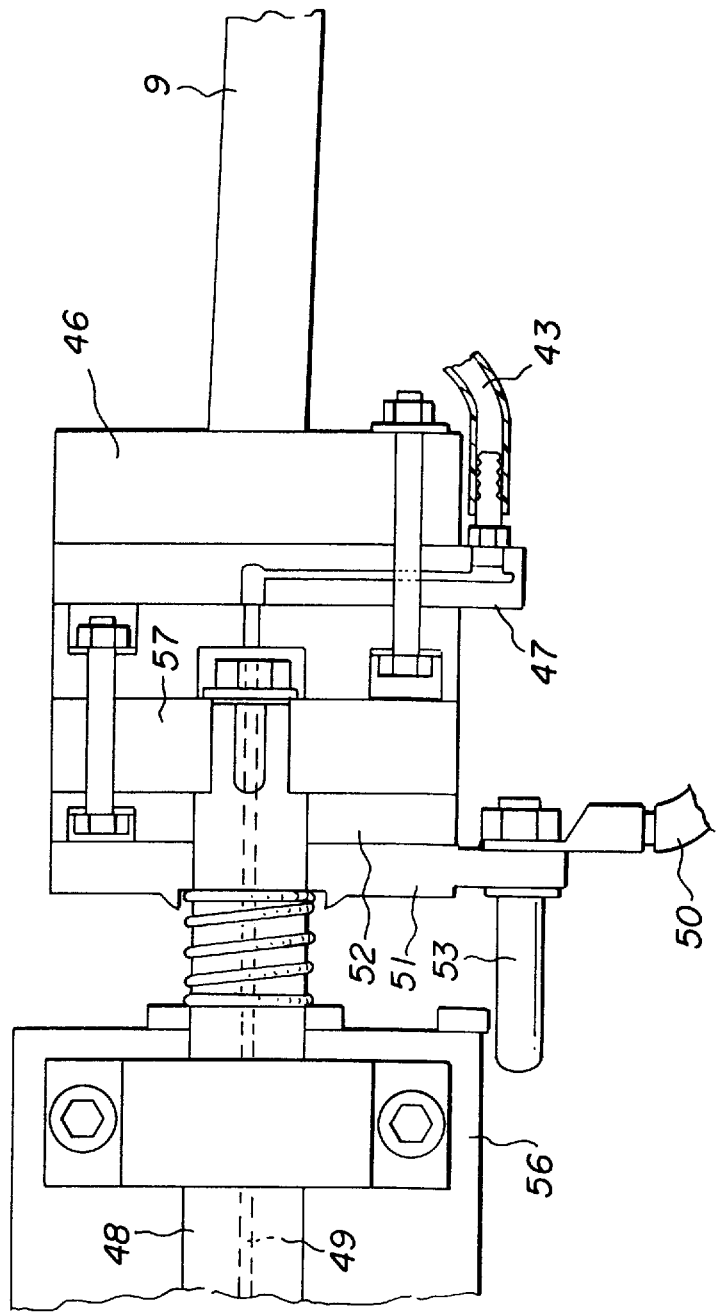
FIG. 5 is a detailed view of a rotary earth and electrical isolation used in the apparatus of FIG. 1.

FIG. 5 shows the other left hand end of drive shaft 9 (left hand in the sense of FIG. 1) connected via constant velocity joint 46 to drive shaft 48. Intermediate plate 47 receives compressed air from line 43 and passes it to the passage 49 in shaft 48. The drive shaft 48 is earthed at 50 via connection to copper plate 51, held stationary by spigot 53 engaged with plate 56. Stationary copper plate 51 engages with rotary plate 52 which is bolted to hub 57 connected via a key to shaft 48. An earthing system is advantageously used to isolate the pipe and plasma cutter particularly from the control end of the apparatus.

Figure 6:
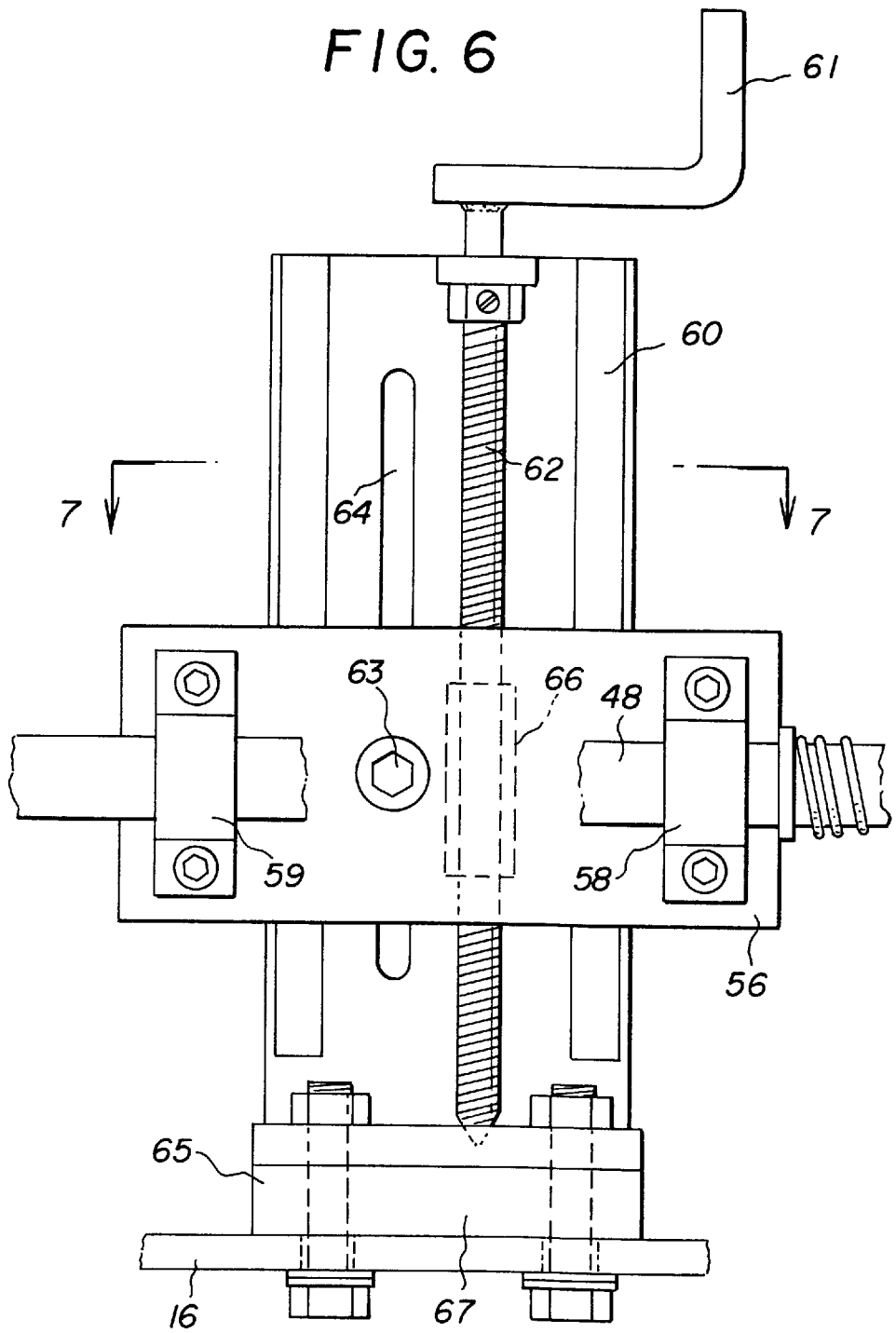
FIG. 6 is a detailed view of a drive plate height adjustment as can be used in the apparatus of FIG. 1.
Figure 7:
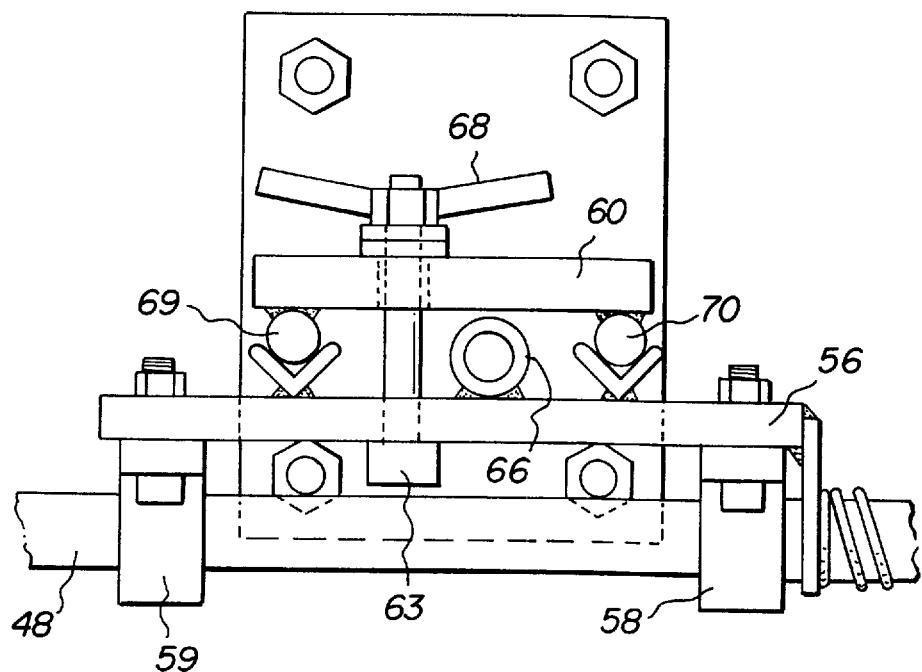
FIG. 7 is a section on 7—7 in FIG. 6.

In FIGS. 6 and 7, shaft 48 passes through bearing blocks 58 and 59 on plate 56 which is mounted for sliding engagement to vertical mounting plate 60 with a crank 61 driving screw 62 in ferrule 66 to move plate 56. Plate 56 is held to plate 60 by a bolt 63 engaged through slot 64 in plate 60. Plate 60 is mounted by bracket 65 to main beam 16 via an insulating block 67 and insulated bolts therethrough. In FIG. 7 is seen a lock nut 68 by which to clamp plate 56 to plate 60. When tension in bolt 63 is released, plate 56 can be slid along rails 69 and 70. The earthing system is used to isolate the plasma torch from the control end of the apparatus. The vertical movement mechanism enables the drive plate to be moved vertically to centralise it with pipe of different dimensions to enable the pipe to be engaged and rotated.

Figure 8:
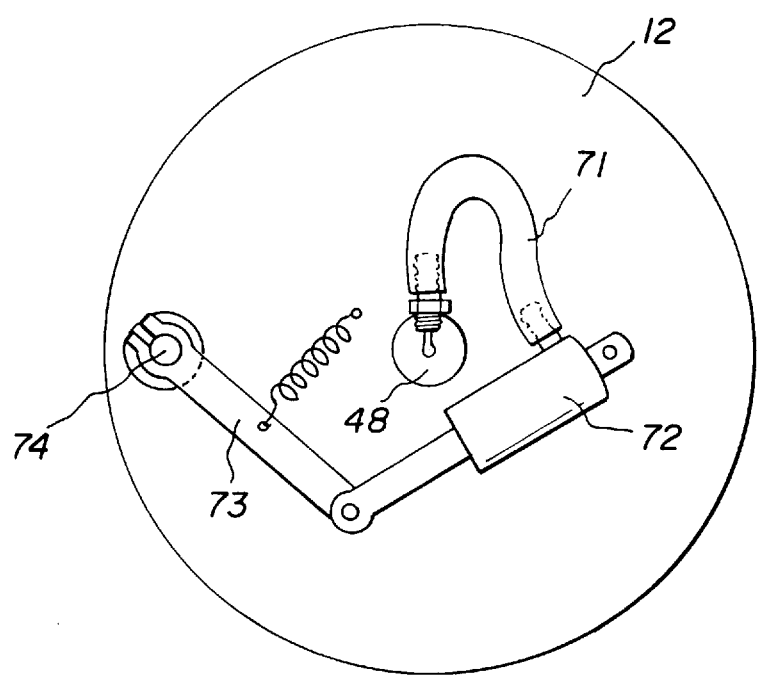
FIGS. 8 and 9 are two views of a drive plate assembly as used in the apparatus of FIG. 1.
Figure 9:
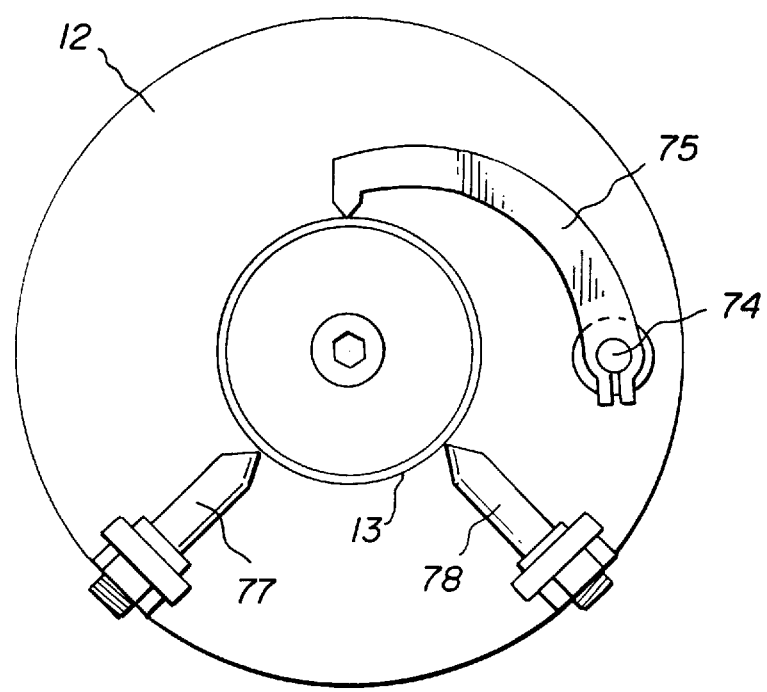

As seen in FIGS. 8 and 9, which view drive plate 12 from opposite sides, shaft 48, which turns plate 12 has an outlet from which compressed air is fed via line 17 to ram 72 to action the crank 73 which, via pin 74, turns clamping arm 75 to hold pipe 13 to pins 77 and 78. The pins centralise the pipe and different length pins, or adjustable pins, are fitted to accommodate different pipe sizes.

Figure 10:
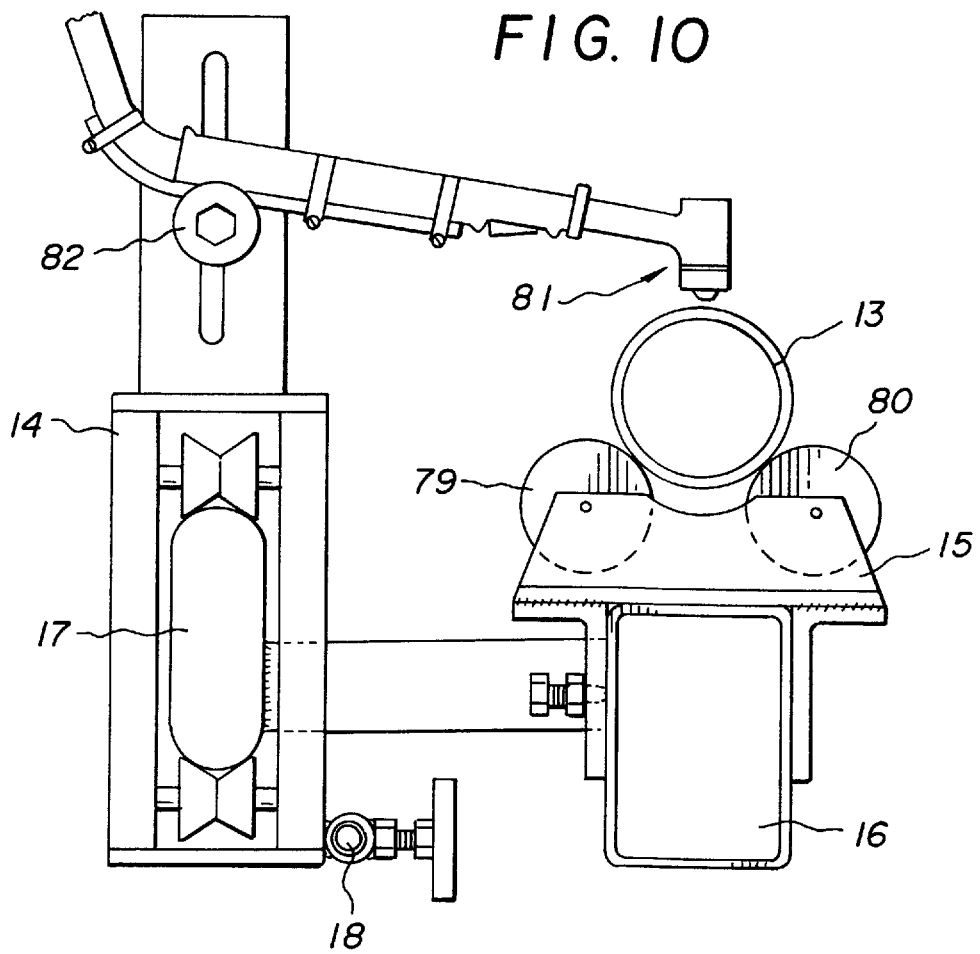
FIG. 10 is a sectional view on 3—3 in FIG. 1.

In FIG. 10, pipe 13 supported on nylon wheels, is rotated under plasma torch 81, which torch is mounted adjustably to trolley 14, to be moved by push-pull rod 18 along rail 17. The shape of the end cut depends on the relative axial movement of the cutter and the rate of rotation of the pipe.

Figure 11:
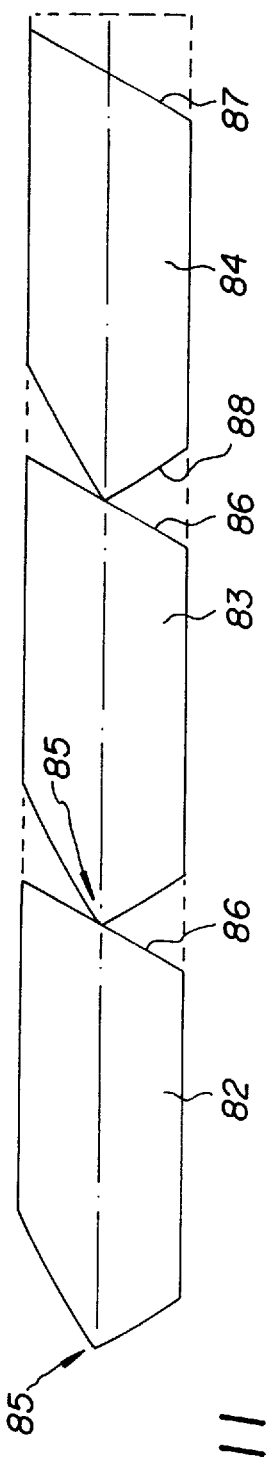
FIGS. 11 to 13 illustrate the form of cuts which might be made in pipe using an apparatus in accordance with the present invention.
Figure 12:
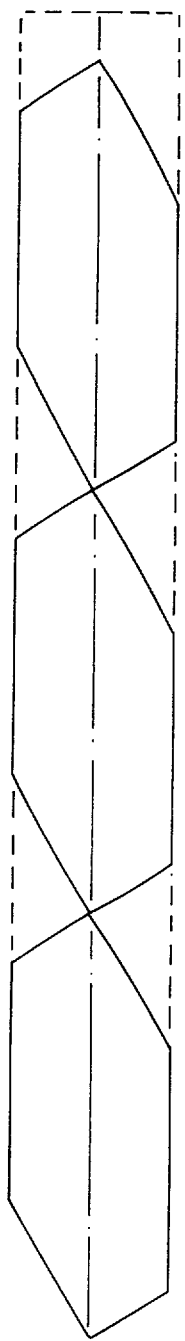
Figure 13:
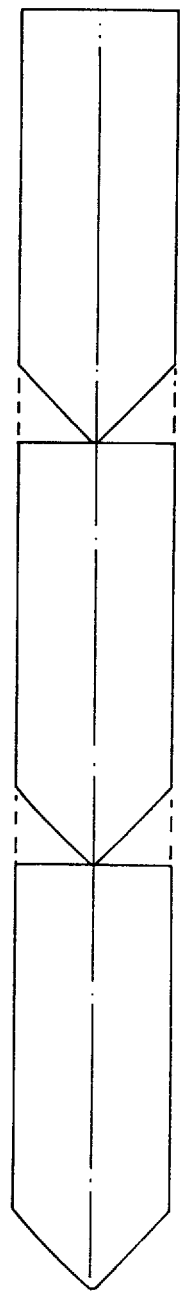
Figure 15:
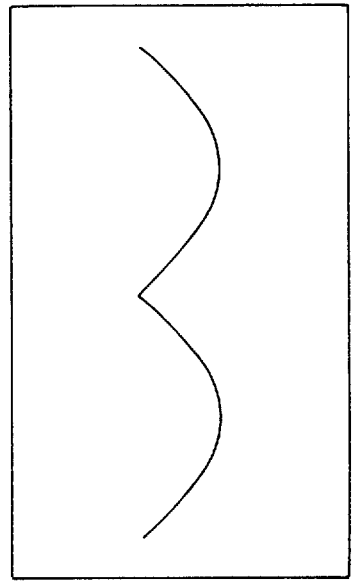
FIGS. 14 to 17 illustrate the connection between the shape of a pipe section and the patterns which produce it.

FIGS. 11 to 13 show how various pipe portions or pieces can be repetitively cut from a length of stock. The cutting is started (for the purposes of explanation) at the right hand end (in the sense of the drawing) with cut 87. The pipe is advanced up to drive plate 12, oriented relative to top dead centre, and engaged by the clamping mechanism on the drive plate 12. Then the plasma cutter is actioned to make first the cut 86 of the pair of cuts at adjoining ends of successive pipe segments as the pipe is rotated and the cutter is moved axially of the pipe, cutting twice round the pipe to secondly effect cut 88 after which the pipe piece 84 is dropped from the machine and the stock is fed from the left to the right to permit continuation of the process so as to cut off pieces 83 and then 82, each with a cut 86 at one end and an apex 85 of a scalloped end at the other. As the two cuts meet at apex 85, the cutter can perform both requisite cuts as a single continuous cut in two turns of the pipe in a continuous operation. The cut 86 is made first because, when complete, the stock pipe length is disengaged from drive plate 12 and only the piece held thereby is moving in synchrony with drum 1. When the pieces are cut off in this manner, waste is minimised to achieve an additional advantage.

FIGS. 12 and 13 show other possible patterns.

Figure 14:
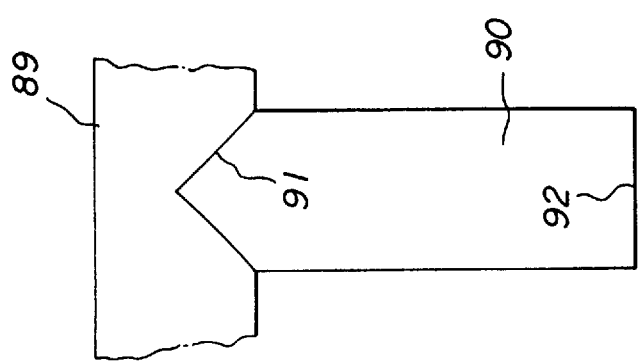

FIG. 14 shows a T-joint between pieces 89 and 90. Piece 89 has a flat end and a curved or scalloped end to receive round pipe 90 therein for welding.

Figure 16:
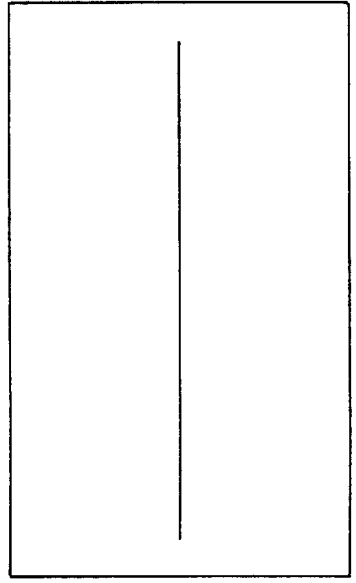
Figure 17:
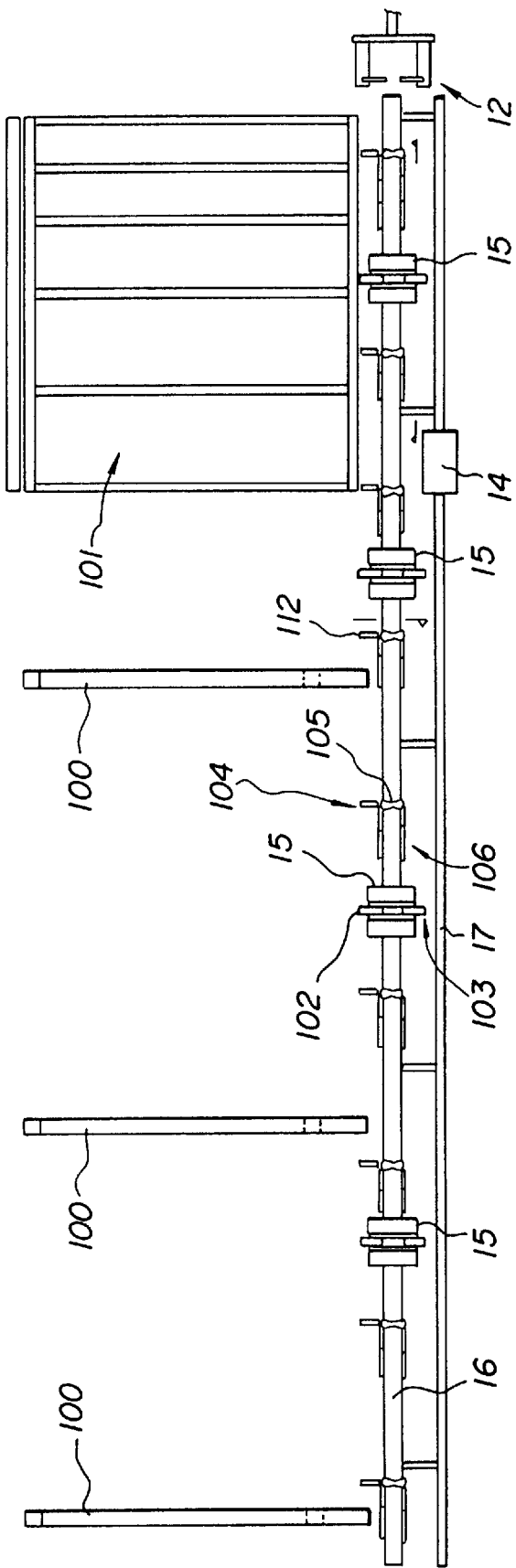

FIG. 16 shows the pattern of end 91 projected onto a flat pattern. End 92 is the straight line of FIG. 17. Wrapped around the drum 1 (of FIG. 1) and traced by a magic eye, these patterns can be used to control a cutting means when the pipe and pattern are suitably synchronised. Piece 90 is cut from stock as in FIG. 13. The process of pattern generation is a straight forward one. If the pipe be imagined to be opened out flat with an axially extended cut in its wall, the two dimensional pattern at the end can be scaled up or down to suit the apparatus. The patterns for two adjoining cuts can be scaled, added together to wrap around drum 1 in FIG. 1 to effect two end cuts in one turn of drum 1. At the end, drum 1 is oriented to commence the next pair of cuts with no further resetting.

The paper patterns are readily generated. A standard PC is readily programmed and the pattern dropped onto paper by a standard printer. The paper is then simply held to the drum by magnetic means. Using the above patterns on drum 1 of FIG. 1, the cutter can be made to progress around the pipe end twice for each turn of drum 1. With different sized pipes, the pattern on drum 1 needs then to be scaled up or down to fit the drum. With large pipes, the templates may be compressed to the point where their features are small and the tracking device has difficulty following the fine details of the pattern. Direct connection of profile generating software to motor 4 would then be desirable. Of course, a different sized drum might be substituted for the existing drum to enable use of patterns at other scales. However, this introduces additional set up times which are better avoided.

With direct connection of the profile generating software with servo motors determining axial cutting head position and pipe rotation, it is possible to pick which cut to do with the machine able to go back to top dead centre for another cut or pair of cuts with the sequence varied at will. This adds a level of flexibility which does not exist with the simpler paper plan system.

It will be clear to those skilled in the art that the requisite patterns, as seen in the drawings, can be formed manually by a draftsman. This is a laborious process. The generation of patterns is best automated with use of computer software. Once this step is undertaken, the software output could be fed straight to servo motors controlling pipe rotation and cutter axial position. These adaptations are within the skills of those with the knowledge of software and automated control systems.

In operation of the apparatus, the sequencing of cuts is best understood by looking at the adjoining pipe ends such as in FIGS. 11 to 13. Where one item ends and the next starts there will be at least one point where the two parts can touch. The very first cut can be made with an extender if the cutting apparatus cannot be moved in close to the clamping plate 12. When the right hand end of the first piece to be formed is cut, the extender is removed. The end is moved up to the drive plate 12. The pipe is rotated if necessary to orient it to put the next cut starting point in proper position relative to the first cut. Then the cutter goes round the pipe twice to make the adjoining pair of cuts. Of the pair the first is the RH end cut of the next piece then the LH end of the piece held by the drive plate is cut. After that the process repeats when the apparatus is of the type in FIG. 1. The point of contact at adjoining ends is a convenient reference whereat to set the top dead centre of the system from which the start position on drum 1 is determined. When cuts, such as those which are differently scalloped at both ends, are made with the extender used at the start, it is necessary to take the drum back to the start point for the cutting of the following pair of adjoining cuts (the two patterns in the single pattern on drum 1 are not the same). The top dead centre point is a suitable reference to work to.

The cutting patterns of figures such as 16 can be further understood if they are imagined to be formed on clear material and rolled into a pipe. The line thereon duplicates the scalloped end of the pipe to be cut. The circumference of a 42 mm OD pipe is 132 mm and this is the length of a wrap around template for this pipe. If the two templates, one for each end, were joined end to end, the template produced would be 264 mm. If the drum 1 had a diameter of 84 mm, the 'double' template would wrap around it. Other size pipes can only be fitted to this size drum by expanding or compressing the template to suit to create a complete loop on the drum for the selected pipe.

Clearly, in a manual system, a collection of drums might be kept to match to pipe diameters being processed to ease up the process of generating patterns. However, computerised systems enable scaling to stretch or compress the pattern to suit a single drum. Alternately, passing control of rotation and axial movement servo motors directly to the software eliminates the need for the drum and an optical tracker. With direct control it is possible to vary the sequence working from a point removed from the rotation head, moving back along the stock length cutting segments off depending on the degree of movement permitted to the cutting head.

With point A in FIG. 16 set at top dead centre, the motor and tracer turned on, the upper trolley, bottom trolley and cutter trolley will follow the template to duplicate the template at the pipe end. Because of the gearing the drive head can be made to revolve twice as the drum goes round once.

In operation of the apparatus of FIG. 1, a steel sheath to the drum 1 enables patterns to be held thereto by magnets.

The various drive sprockets 7 are provided because greatly differing diameter pipes may need to be rotated at speeds outside the range of the motor for effective cutting. Small pipes might use 2:1, large pipes 12:1.

The constant velocity joints are fitted so that height adjustment of the drive plate via the adjustor 11 (see FIG. 1) does not affect machine operation because of different heights in the two drive shafts.

The earthing arrangement is used when electrical cutting equipment such as a plasma torch is used. In this arrangement, the pipe and drive shaft must be isolated from the rest of the machine.

The plasma cutter height adjustment is to accommodate different diameter pipes. The mounting permits the cutter to be rotated out of the way when pipe is being loaded to or removed from the apparatus.

The pipe support assembly 15 (see FIG. 1) may be removable when length of a pipe portion might bring the plasma cutter too close to the insulating nylon wheels. This permits their being removed to a point away from the cutter.

In operation of the above apparatus of FIG. 1:

appropriately stretched or compressed templates are applied to drum 1;

the tracer is set over the start point;

the pipe to be cut is loaded;

the correct length centralising pins are fitted to the drive plate;

the pipe is brought up to the drive plate;

the drive plate height is adjusted to suit;

the plasma cutting head is set;

the cutting head trolley is centred at the correct distance from the drive plate;

the trolley is locked to the push-pull rod;

the drive plate pneumatic pipe lock can be operated; and the plasma cutter and motor are started.

From that point cutting proceeds automatically. When the PVC flag 29 cuts the photocell beam, the machine turns off. The plasma cutter can be pivoted up, the pneumatic ram turned off, the pipe piece removed, the remainder slid up to the drive plate and the sequence can be repeated.

The above sequence applies to cutting of pipe segments with a flat pipe end as in FIG. 13. With flat end pipe pieces, orientation is not critical. To cut those of FIGS. 11 to 12, the following can be done:

scribe a straight line along the length of the stock;
the plasma cutter is centred over the line; and
cutting is started but stopped after one turn.

The above sequence sets the first cut end. The pipe is then brought up to the drive plate, the cutting head is aligned with the scribed mark, the pipe is locked, the drum is returned to its start, and cutting commenced. The first cut of the pair is done with the first cut being that at the end of the next pipe portion, then the second cut is that required to finish off the first portion. This sequence then repeats.

Figure 18:
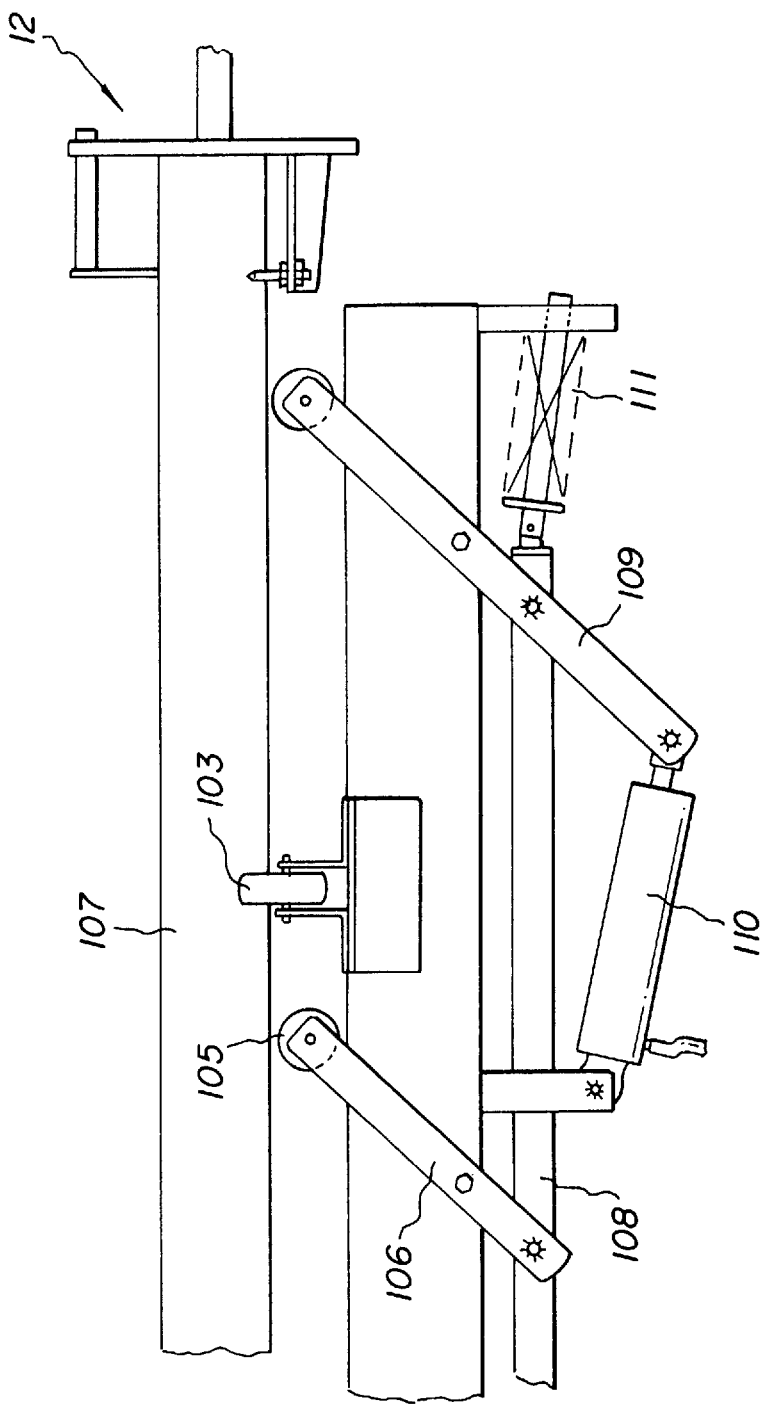
FIGS. 18 to 22 illustrate pipe handling mechanisms which can be used in the apparatus of FIG. 1.
Figure 19:
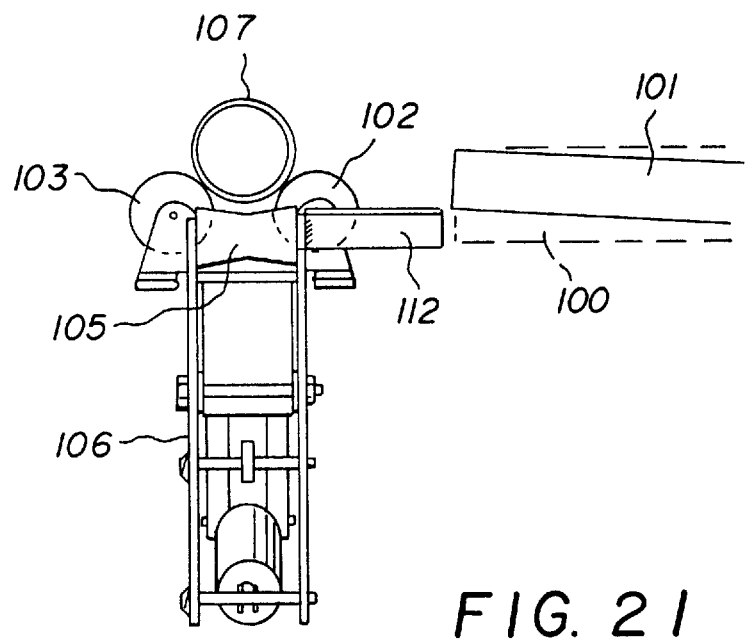
Figure 21:
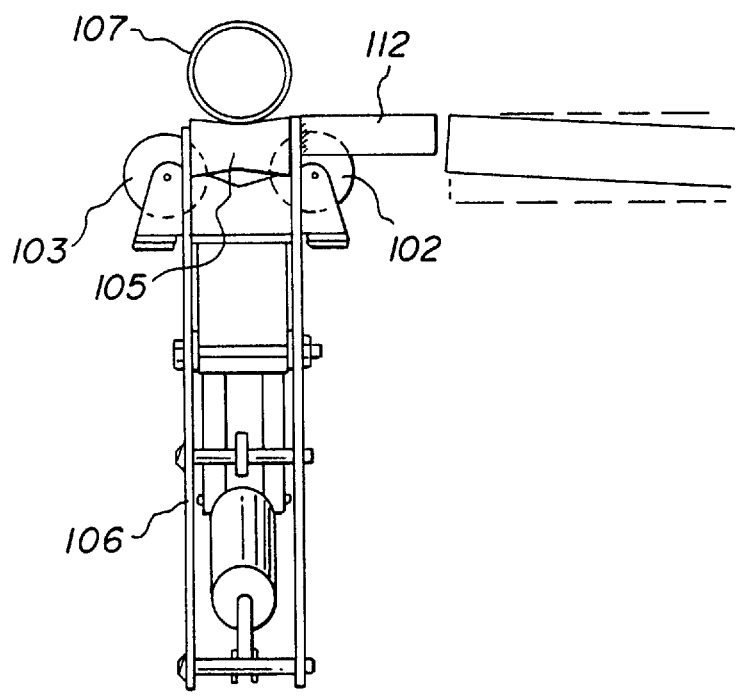
Figure 20:
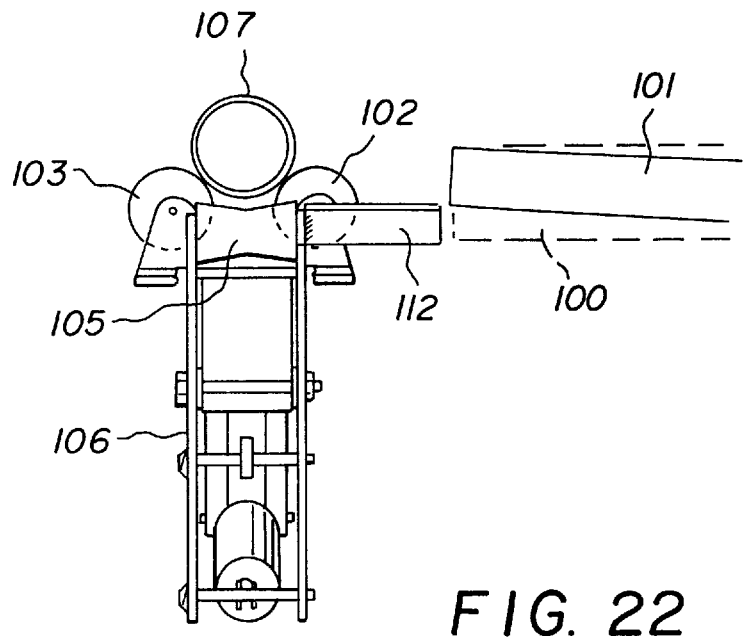
Figure 22:
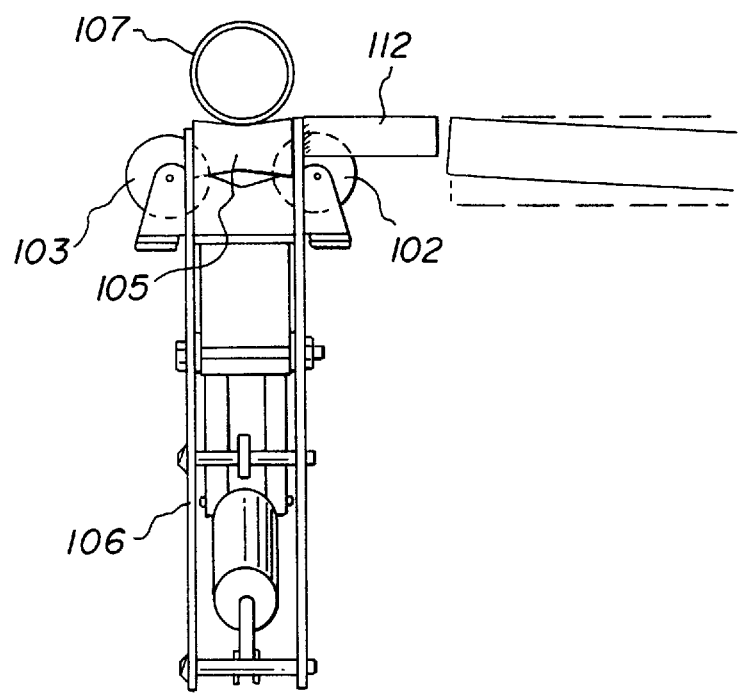

FIG. 18 is a plan view of an apparatus in accordance with the invention showing its pipe handling mechanisms. Pipe storage racks 100 are provided across which stock lengths can be stored in axial alignment with the apparatus with the usual release mechanisms allowing pipe to roll off the racks onto the pipe support assemblies such as 15 when new pipe is to be fed into the apparatus. The pipe might be loaded onto the racks by a fork lift. The pipe support assemblies such as 15 are located along the length of the main chassis beam 16. Each has a pair of rollers 102 and 103 which permit the pipe to be rotated under a cutter on plasma trolley 14 on track 17. To enable the pipe to be moved axially up to drive plate 12 there are a plurality of lifting devices such as 104 with rollers 105 on lever arms 106.

FIGS. 19 to 22 show greater detail in elevations and transverse sections. The lever arms 106 are interconnected by a push rod 108 and biassed by a spring 111 to a lowered position out of engagement with pipe 107 to permit its rotation. An arm 109 is powered by a ram 112 to action push rod 108, to swing the lever arms and raise rollers 105 under pipe 107 to lift it off the rotary pipe supports. Rollers 105 permit axial movement. When the pipe is moved up to drive head 12 the arms 106 are returned to the disengaged position. Each lever arm assembly has a short rail 112 which bridges the gap between the pipe 107 on rollers 105 and the storage rack 101. A cut segment is simply pushed off rollers 105 onto rack 101.

In the above apparatus, stock pipe is rolled onto the apparatus; its end is advanced up to drive plate 12; a segment is cut; the segment is disengaged from drive plate 12 and rolled off onto rack 101; the stock can be advanced again to the drive plate 12 and the process repeated.

Various changes and modifications may be made to the embodiments described and illustrated without departing from the present invention.

It will be appreciated that savings are achievable in even the more basic apparatus when end cuts are able to be produced in pairs off tracking signals, moving the cutter from one end cut to the other adjoining end cut in a continuous movement. Savings are achieved also by the pipe handling mechanism by which the stock pipe is lifted and movable axially to be lowered onto a set of rotation permitting supports. Additional savings are achieved by direct coupling of software generated patterns to servo motors with the cutter movable along a substantial length of the stock pipe.

We claim:

1. A pipe cutting apparatus for providing profiled end cuts to pipe segments, said segments being cut off a length of stock pipe fed to the pipe cutting apparatus, said pipe cutting apparatus including:
   pipe support means for axially aligning a length of stock pipe in the pipe cutting apparatus and mounting it for rotation about its axis;
   pipe locating means for rotationally or angularly locating the stock pipe in the pipe cutting apparatus;
   pipe cutting means for effecting end cuts of a desired shape in the stock pipe; and
   end cut guidance means for operatively controlling the pipe locating means and the pipe cutting means in tandem to effect a sequence of cuts in the length of stock pipe which is fed into the pipe cutting apparatus, the pipe cutting apparatus being operative such that at least one cut in the sequence of cuts generates end cuts on two pipe segments with said two end cuts effected in a single continuous cut.

2. A pipe cutting apparatus according to claim 1 wherein the pipe support means comprises a first linear array of roller pairs supporting the length of stock pipe therebetween with the roller axes of each pair of rollers being parallel to the length of the pipe, and a second linear array of pipe lifting rollers with the axes of the roller pairs lying in a plane orthogonal to the axis of the length of pipe.

3. A pipe cutting apparatus according to claim 2 wherein the lifting rollers pairs are each on a lever arm actioned by a common push rod operated by a hydraulic ram.

4. A pipe cutting apparatus according to claim 1 wherein the pipe locating means comprise a rotatable end clamping plate against which the length of stock pipe can abut to be engaged by a clamping mechanism mounted thereto, the pipe locating means being driven to rotate, in use, under control of the end cut guidance means.

5. A pipe cutting apparatus according to claim 4 wherein the clamping plate includes at least two radially adjustable positioning means abutting the outer wall of a pipe end and adjustable to center the pipe relative to the axis of rotation of the clamping plate and a clamping means which engages the pipe to clamp the pipe against the positioning means under pressure applied by a ram.

6. A pipe cutting apparatus according to claim 1 wherein the pipe cutting means comprises a plasma torch cutting radially through the pipe wall and positioned at top dead center over the pipe and movable therealong on a support trolley rolling on a support track, the trolley being moved by a push rod powered by a servo motor in accordance with the end cut guidance means.

7. A pipe cutting apparatus according to claim 1 wherein the end cut guidance means controls axial movement of the pipe cutting means in synchrony with rotation of the length of pipe effected through the pipe locating means.

8. A pipe cutting apparatus according to claim 7 wherein the control of the pipe cutting means relative to the rotation of the length of the pipe is determined by control signals to a servo motor operative to adjust the axial position of the cutting means in synchrony with rotation of the pipe, the control signals being produced by software off a desired pipe pattern with adjoining pairs of end cuts cut in a continuous sequence.

9. A pipe cutting apparatus according to claim 8 wherein the software generates paper patterns which, in use, are applied to a drum which is moved in synchrony with the pipe with an optical trackers output being interfaced to the servo motor, the paper pattern providing a single continuous line for adjoining end cuts enabling continuous cutting of the adjoining end cuts so as to form in one rotation of the drum the opposite ends of two adjoining pipe segments.

10. A pipe cutting apparatus according to claim 1 wherein the pipe support means separately supports the pipe for rotation about its axis or for movement axially of the pipe and the pipe locating means is movably mounted to enable its axis of rotation to be aligned with the axis of the pipe.

11. A pipe cutting apparatus according to claim 10 wherein the pipe locating means engages the pipe with a ram operated clamping means, clamping the pipe, in use, against radially adjustable engagement means, adjustable to align the pipe axis with the axis of rotation of the pipe locating means.

12. A pipe cutting apparatus according to claim 1 wherein the end cut guidance means controls the pipe cutting means through two turns of the pipe to effect two ends cuts in one continuous cut.

13. A pipe cutting apparatus according to claim 12 wherein the pipe cutting means is moved axially as the pipe rotates to effect a cut of predetermined pattern.

14. A pipe cutting apparatus according to claim 1 wherein the pipe support means enables axial relocation of the stock pipe, when a pipe segment is removed, up to the pipe locating means such that the stock pipe is reengaged for rotation and effecting a further end cut pattern.

15. A pipe cutting apparatus according to claim 14 wherein pipe supported for rotation on roller pairs is selectively engageable by a further set of rollers on lever arms ganged to a common, ram operated push rod whereby the pipe can be lifted for axial translatory movement.

16. A pipe cutting apparatus according to claim 1 wherein said end cuts are effected in a single continuous cut as the pipe is rotated twice.

17. A method of cutting pipe to produce a particular shaped end configuration comprising the steps of:

rotating the pipe about its axis at a set rate;

moving a pipe cutting device axially of the pipe in synchrony with rotation to effect cutting;

governing the pattern of axial movement of the pipe cutting device relative to the rotation to effect the particular end shape which is desired; and effecting the end cut of one pipe segment and the end cut of an adjoining pipe segment in one continuous cut as the pipe is rotated twice.

18. A method of cutting pipe according to claim 16 further comprising the steps of discharging the cut segment and advancing the shaped end of the remaining stock past the pipe cutting device for repetition and discharge of a further segment, after said step of effecting a pair of end cuts.

19. A method of cutting pipe according to claim 16 wherein a length of stock pipe is located under the pipe cutting device and rotated during cutting and further comprising the steps of releasing a cut segment and advancing the length of stock pipe past the cutting device to permit cutting of a further segment.

20. A method of cutting pipe according to claim 16 wherein a length of stock pipe is located under the pipe cutting device and rotated during cutting and further comprising the step of advancing the pipe cutting device to permit repetition of the pipe cutting at a new location along the length of stock pipe.

* * * * *